US006882942B1

(12) United States Patent
Duduman

(10) Patent No.: US 6,882,942 B1
(45) Date of Patent: Apr. 19, 2005

(54) ACCESSING MAIN ATX OUTPUTS WITHOUT MONITORING ALL OUTPUTS

(75) Inventor: Bogdan M. Duduman, Raleigh, NC (US)

(73) Assignee: Intersil Corporation, Palm Bay, FL (US)

( * ) Notice: Subject to any disclaimer, the term of this patent is extended or adjusted under 35 U.S.C. 154(b) by 0 days.

(21) Appl. No.: 09/552,117

(22) Filed: Apr. 19, 2000

Related U.S. Application Data

(60) Provisional application No. 60/130,828, filed on Apr. 23, 1999.

(51) Int. Cl.[7] .............................................. G01F 21/00
(52) U.S. Cl. ............................ 702/60; 702/57; 702/89; 702/189; 340/870.39; 340/455; 340/693.1; 340/7.32; 324/433; 324/607; 324/76.11; 327/58; 327/161; 327/547; 700/22; 700/27; 700/297
(58) Field of Search ............................. 702/60, 67, 89, 702/189, 57, 122, 124, 126, 182, 183, 188; 340/870.39, 455, 636, 661–663, 693.1, 7.32; 324/433, 607, 425, 76.11; 327/58, 161; 700/22, 27, 297, 21, 75, 82, 121, 286; 307/2, 6, 15, 8, 17, 18, 19–22, 26–28, 31–35, 128–130, 139–141

(56) References Cited

PUBLICATIONS

National Semiconductor, LM2637 Motherboard Power Supply Solution with a 5–Bit Programmable Switching Controller and Twol Linear Regulator Controllers, Published on Oct. 1998.*

Kelly, 'A Soft Starting AC Voltage Regulator', 1992, IEEE, pp. 184–185.*

Duduman, Bogdan, M., "Advanced PWM and Dual Linear Power Control", Intersil Corporation 1999, pp. 2–210–2–223.

Duduman, Bogdan, M., "Total Power Conversion Solutions for Computer Motherboards Using HIP6017, HIP6019 Controller ICs", Intersil Corporation 1999, pp. 4–67–4–77.

Duduman, Bogdan, M., "Triple Linear Power Controller with ACPI Control Interface", Intersil Corporation 2000, pp. 1–14.

Duduman, Bogdan, M., "Power Management IC Simplifies ACPI Implementation (HIP6501AEVAL1)", Intersil Corporation 1999, pp. 4–148–4–158.

* cited by examiner

*Primary Examiner*—Marc S. Hoff
*Assistant Examiner*—Elias Desta
(74) *Attorney, Agent, or Firm*—Fogg and Associates LLC; Scott V. Lundberg

(57) ABSTRACT

A power monitor circuit and method delays the start of a computer until multiple power lines are at a safe level of operation. The integrated circuit monitors only the voltage of a primary power supply output and eliminates the need for monitor circuits on each supply output. The power supply is made to exacting specifications that tie the 5 volt and 3.3 volt supplies to the primary 12 volt supply. The ATX power supply drives the 3.3 and 5.0 supplies to reach 90% of their values within 40 ms after the 12 volt supply reaches 90% of its value. A time delay circuit 25 delays switching the 3.3 and 5 volt dual outputs from the standby voltage supply to the active voltage supplies until after the primary 3.3 and 5 volt are at a safe operating level.

25 Claims, 4 Drawing Sheets

ACCESSING MAIN ATX OUTPUTS WITHOUT MONITORING ALL OUTPUTS

This patent is a conversion of U.S. Provisional Application Ser. No. 60/130,828 filed Apr. 23, 1999.

BACKGROUND

This invention relates to a power monitor circuit and in particular to a circuit for monitoring the power of a personal computer.

Personal computers have circuits that monitor control the power supplied to different in parts of the computer. Some parts, such as memory, require a different voltage than other parts, such as the microprocessor. In order to conserve power and lengthen the life of the integrated circuits, it is economical to reduce the power available to components when the computer is inactive. Most computers have a power saving feature that reduces the power consumption after a predetermined idle time. The operator may have control of that time. During the power down time, minimal power is supplied to the computer. In theory, one only needs to supply enough power to sense when the user returns to resume usage (full power required). Despite the speed of integrated circuits, there remains a finite amount of time for the power supplies to reach their nominal operating levels. If the computer begins operation before the input power supplies reach their nominal operating levels, computations and operations performed by the computer may be erroneous. Such premature operation may cause errors in operation that, in return, could cause the computer to fail and shut down. Then, the user will have to restart the computer or perhaps repair it as well.

The power management feature contributes to overall efficiency, saves energy and reduces the cost of operating the computer. As personal computers become more sophisticated, the power up and power down monitoring circuits have likewise grown in sophistication. More sophisticated circuits are required because the computer uses numerous voltages. Some of the primary voltages used in a computer are 12 volts, 5 volts, and 3.3 volts. These are supplied from an AC/DC converter to other devices and chips within the computer. As such, the motherboard on a computer requires still further voltages derived from the primary voltages for operating memory chips, graphics chips and clock chips. Nevertheless, all of those derived voltages are derived from the three primary voltages of 12, 5, and 3.3 volts.

It is important that the various devices be powered up and powered down in the manner specified by the computer manufacturer. Unless the power up and power down operations are controlled and there is sufficient power, valuable data may be lost or the system may conflict with itself and crash.

For proper operation, the three primary voltages must be at or about 90% of their expected operating level. Microprocessor vendors, such as Intel Corporation, specify that the microprocessor and the motherboard will be fully operational after a predetermined time window. That time window is currently set to about 100 ms. In order to assist PC manufacturers, Intel also specifies that the 3.3 and 5.0 volt supplies must reach 90% of their value in less than 40 ms. The problem faced by computer manufacturers is how to monitor the primary voltages to determine when the voltages derived from the primary voltages can be created.

Some manufacturers have proposed using three power supply monitor chips, one for each primary voltage. That is a straightforward approach, but it multiplies the number of power supply monitors to match the three primary voltages. Still others have suggested using a single chip for monitoring the power supplies and on that single chip include three primary voltage monitor circuits, i.e., one circuit for each of the three primary voltages.

SUMMARY

The invention improves upon the solutions of the prior art by providing a single power monitor-integrated circuit with a single input primary voltage pin. The invention accomplishes this desirable result by using the inherent features of the power supply. The power supply is made to exacting specifications. The power supply will drive the 3.3 volt and 5.0 volt supplies to reach 90% of their values within 40 ms after the 12 volt supply reaches 90% of its value. A suitable time delay circuit delays switching the 3.3 volt and 5 volt dual supplies from the standby voltage supply to the active voltage supply until after the primary 3.3 volt and 5 volt are operating.

The invention provides an integrated circuit that monitors and controls power from a computer ATX power supply. A conventional ATX power supply generates a plurality of different output voltages but the 3.3, 5, and 12 volt outputs are derived from a single power transformer. The integrated circuit includes one input pin that provide input means for receiving a representative power output (12 volt in this case) from We ATX power supply. The integrated circuit also includes a conventional linear power controller circuit for controlling each of its power outputs. A comparator circuit compares a signal representative of the primary power voltage to a reference signal. A voltage divider provides one input to the comparator and the other input is provided by a threshold reference source. When the divided signal exceeds the threshold, the comparator output a signal indicative of the results. That signal means the primary power supply bas reached at least 90% of tits targeted value. The output of the comparator then triggers a timing circuit. The switchover of the power outputs, controlled by the integrated circuit from the standby input supply to the main ATX outputs, is delayed by the timing circuit for a set time that corresponds to the timing specifications of the ATX supply. Those specifications require that the primary power sources be at their respective voltage levels with a very controlled time, typically 40 milliseconds. The timing circuit is set to a delay time that equals or exceeds the ATX specification. After the time delays expires, the invention generates a power up signal. At that time the power outputs controlled by the integrated circuit are switched to the primary input power sources, such that at the end of the 100 millisecond period, the computer may enter the active state of operation.

DRAWINGS

DETAILED DESCRIPTION

Figure 1:
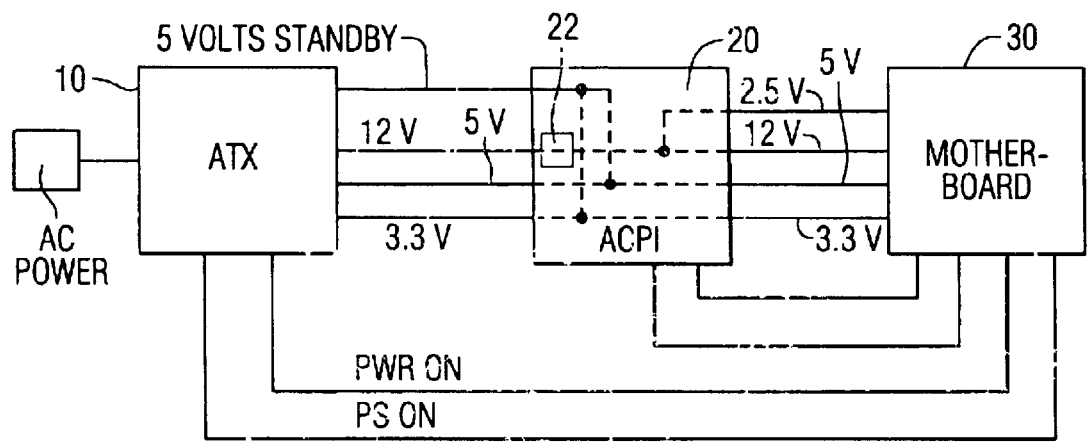
FIG. 1 is a high level schematic of the power distribution system in a computer.

With reference to FIG. 1, there is shown a high-level circuit schematic of a portion of a personal computer. The ATX AC/DC power supply 10 includes a transformer and DC to DC converter circuitry. The power supply 10 includes a connection at its input to a source of alternating current. Its nine outputs include a 5-volt standby output and three primary voltage outputs of 12, 5 and 3.3 volts. The outputs from the ATX power supply are tightly coupled to one another. Indeed, they are all derived from the same AC transformer. Once the primary 12 volt power supply passes 90% of its nominal setting, the 5 volt and 3.3 volt supply will equal or exceed 90% of their nominal settings no later than the end of the 40-ms window. In effect, it is possible to use the 12 volt primary power voltage as a proxy for the other primary voltages. It is not necessary to actually monitor the 5 and the 3.3 voltages because they are related to the 12 volt supply. Instead, one monitors the 12 volt supply for overall compliance. Once the 12 volt supply is in compliance, the 5 and 3.3 volt supplies will be in compliance by the end of the 40-ms window.

Figure 2:
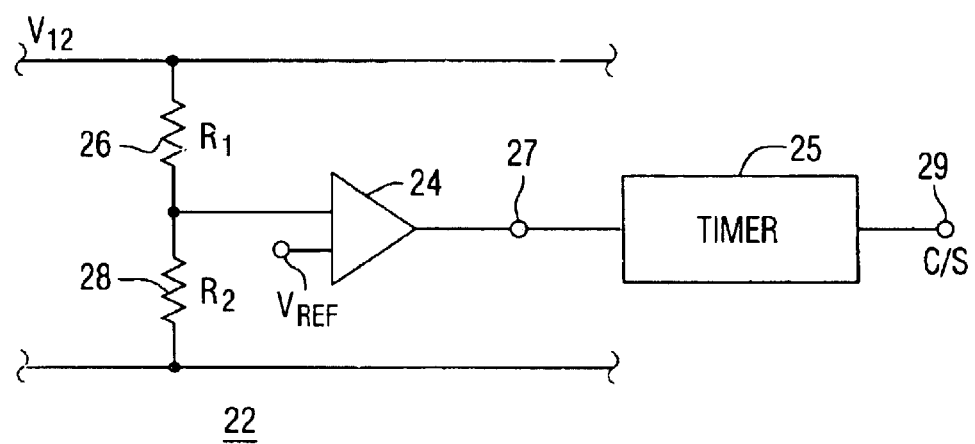
FIG. 2 is schematic of the comparator circuit of the invention.

The invention is implemented by incorporating a comparator circuit 22 into the power monitor of the integrated circuit 20. The comparator circuit 22 is a resistor divider network that includes resistors R1 and R2. See FIG. 2. Resistors are chosen of sufficient value so that the voltage into the comparator 24 is divided to be within the range of the 5 volt standby power supply. The voltage $V_{REF}$ input to comparator 24 is derived from the 5 volt standby power supply. The maximum reference level is set to 90% of the nominal value, i.e., 90% of 12 v=10.8 volts. In the preferred embodiment, the reference voltage is approximately 1.2 volts and the voltage divider is a 9-to-1 divider. Thus, when there are 10.6 volts across resistor R2, the inputs to the comparator are equal and the output signal at terminal 27 of the comparator is high indicating that the voltage $V_{12}$ is approximately 90% of its nominal value. The high signal at terminal 27 is transmitted via control line 32 to a circuit that creates the derived voltages. The high output of the comparator 24 is delayed by time delay circuit 25. The control signal indicates that the power supplies for 5, 3.3 and 2.5 volts are now at suitable levels for use to create the derived voltages.

Figure 3:
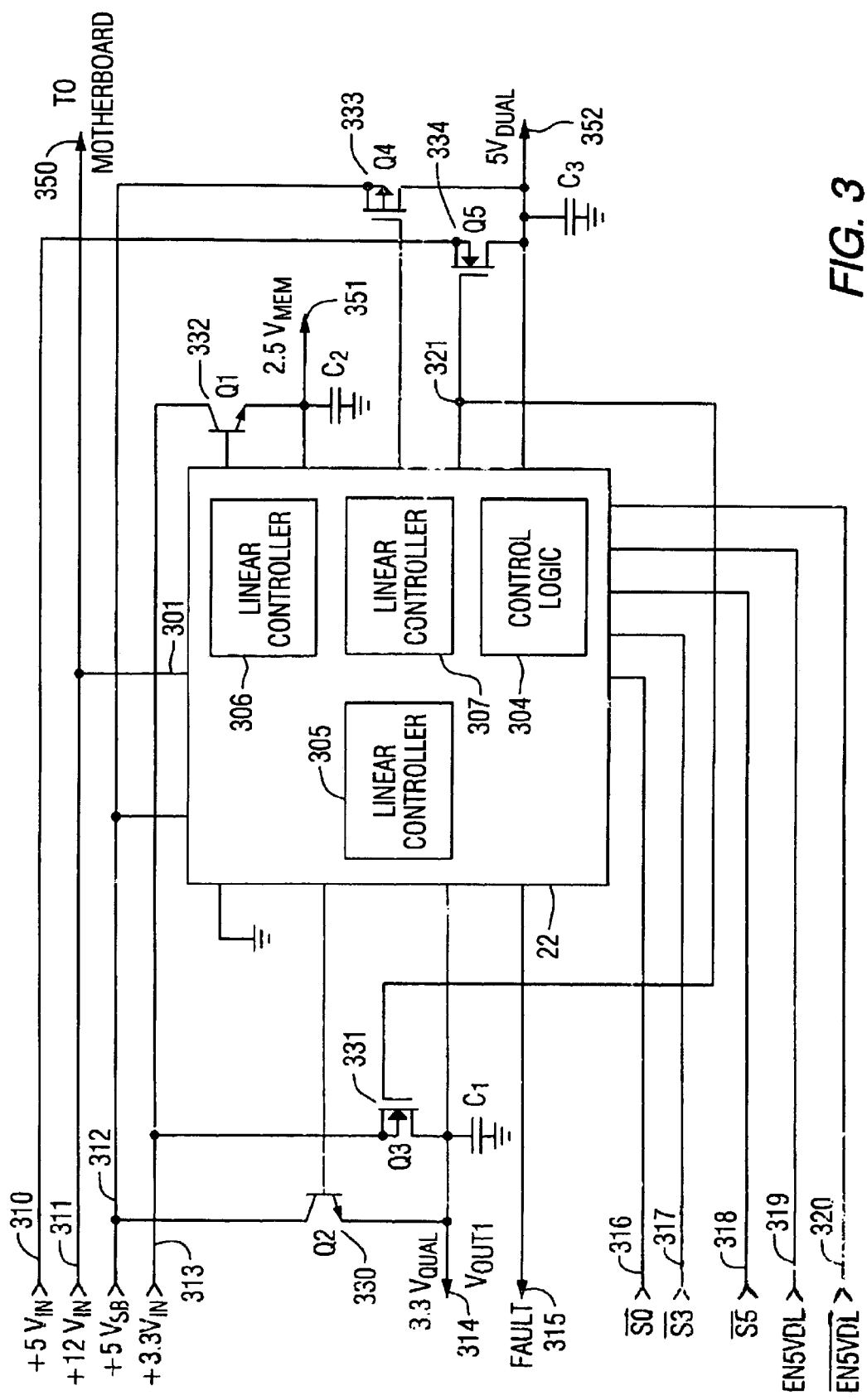
FIG. 3 is a schematic of an integrated circuit using the power management circuit of the invention.

Turning to FIG. 3, further details of the invention are provided. The 12 volt primary power supply signal from the power supply 10 is supplied to the motherboard and is monitored via line 301. That line provides an input to a voltage divider (not shown; see FIG. 2) that is contained inside the monitor integrated circuit 22. The power monitor integrated circuit 22 includes a timing circuit (not shown; see FIG. 2) that measures the time from when the 12 volt supply equals or exceeds 90% of its nominal value. That time is less than the 100-ms window for the motherboard. When the timing circuit times out, the control logic 304 controls the operation of transistors Q2, Q3, Q4 and Q5 to switch the 5 volt and 3.3 volt dual outputs from their standby voltage input to the line voltages from the power supply 10.

The circuit 22 simplifies the implementation of ACPI-compliant designs in microprocessor and computer applications. The circuit 22 (representative of an entire family of power management circuits) integrates two linear controllers and a low-current pass transistor, as well as the monitoring and control functions into a 16-pin SOIC package. One linear controller 305 generates the 3.3V DUAL voltage plane from an ATX power supply's 5VSB output during sleep states S3, S4/S5), powering the PCI slots, and other peripherals, through an external pass transistor, as instructed by the status of the 3.3V DUAL enable pin. An additional pass transistor is used to switch in the ATX 3.3V output for operation of this output during S0 and S1 (active) operating states. The second linear controller 306 supplies the computer system's 2.5V/3.3V memory power through an external pass transistor in active states. During S3 state, an integrated pass transistor supplies the 2.5V/3.3V output sleep-state power. A third controller 307 powers up a 5V DUAL plane by switching in the ATX 5V output in active states, or the ATX 5VSB in sleep states.

The operating mode of circuit 22 (active-state outputs or sleep-state outputs) is selectable through two control pins: 319 and 318. Further control of the logic 304 governing activation of different power modes is offered through two enabling pins: 319 and 320. In active states, the 3.3V DUAL linear regulator 305 uses an external N-channel pass MOS-FET 331 to connect the output 314 (V OUT1) directly to the 3.3V input supplied by an ATX (or equivalent) power supply, while incurring minimal losses. In sleep state, the 3.3V DUAL output is supplied from the ATX 5VSB 312 through an NPN transistor 330, also external to the controller. Active state power delivery for the 2.5/3.3V MEM output 351 is done through an external NPN transistor 332, or an NMOS switch for the 3.3V setting. In sleep states, conduction on this output is transferred to an internal pass transistor. The 5V DUAL output 352 is powered through two external MOS transistors. In sleep states, a PMOS (or PNP) transistor 333 conducts the current from the ATX 5VSB output, while in active states, current flow is transferred to an NMOS transistor 334 connected to the ATX 5V output. Similar to the 3.3V DUAL output, the operation of the 5V DUAL output 352 is dictated not only by the status of the 317 and 318 pins, but that of the EN5VDL enable pin 319 as well.

A 5VSB power on reset (POR) signal initiates a soft-start sequence. An internal 10 $\mu$A current source charges an external capacitor to approximately 2.8V. Error amplifiers reference inputs are clamped to a level proportional to the soft-start pin voltage. As the soft-start pin voltage slews from about 1.25V to 2.5V, the input clamp allows a rapid and controlled output voltage rise.

Figure 4:
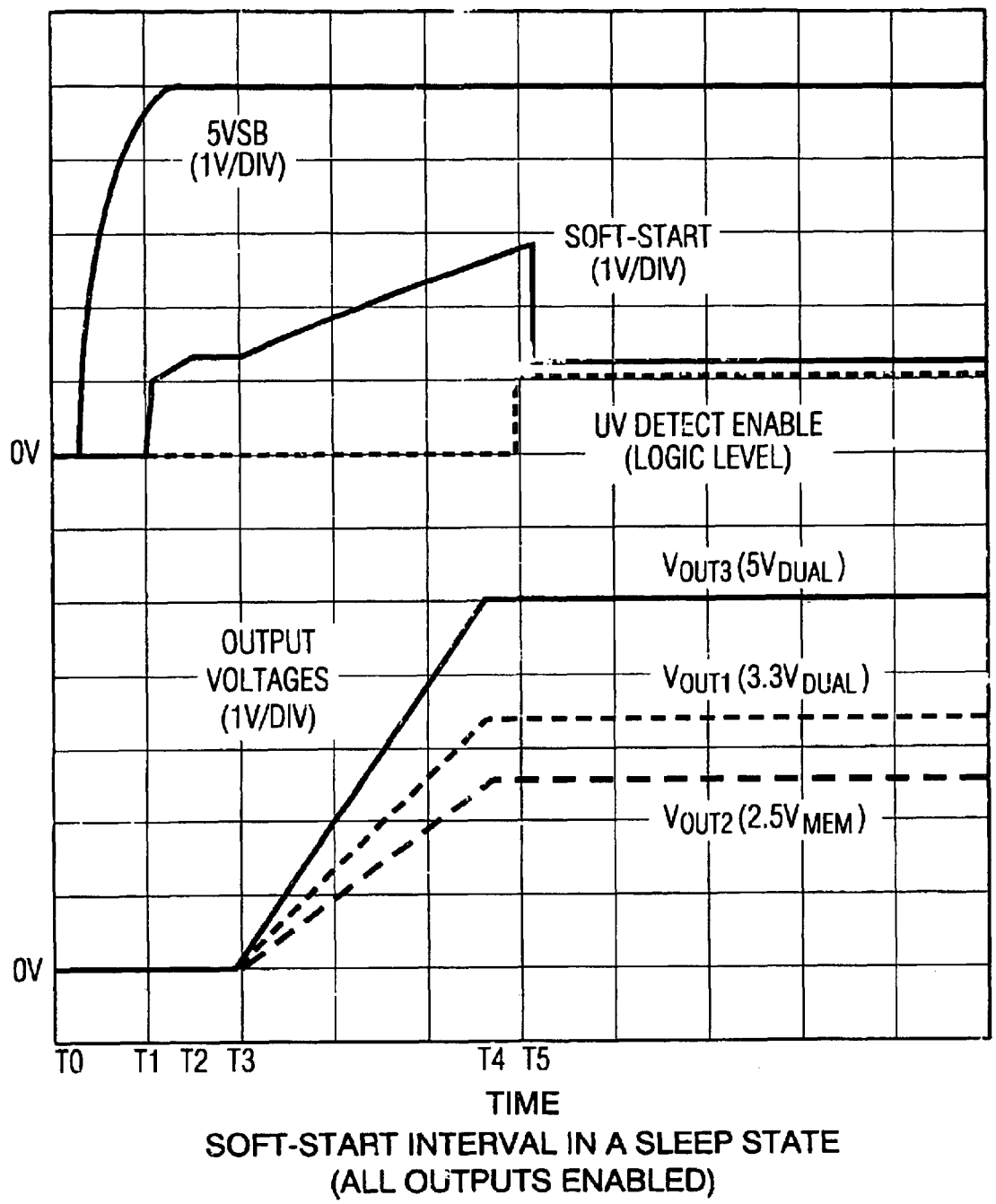
FIG. 4 is a graph showing a soft start interval in a sleep state with all outputs enabled.

FIG. 4 shows the soft-start sequence for the typical application start-up in a sleep state with all output voltages enabled. At time T0 5V SB (bias) is applied to the circuit. At time T1, 5V SB surpasses POR level and an internal fast charge circuit quickly raises the SS capacitor voltage to approximately 1V. At this point, the 10 $\mu$A current source continues to charge the capacitor up to T2, where a voltage of 1.25V(typically) is reached and an internal clamp limits further charging. Clamping of the soft-start voltage (T2 to T3 interval) should only be observed with capacitors smaller than 0.1 $\mu$F. Soft-start capacitors of 0.1 $\mu$F and above should present a soft-start ramp void of this plateau. At time T3, 3 ms (typically pas the 5V SB POR (T1), the 10 $\mu$A current source resumes charging the soft-start capacitor. At this point, the error amplifiers' reference inputs are starting their transitions, causing the output voltages to ramp up proportionally. The ramping continues until time T4 when all the voltages reach the set value. At time T5, when the soft-start capacitor value reaches approximately 2.8V, the under-voltage monitoring circuits are activated and the soft-start capacitor is quickly discharged down to the value attained at time T2 (approximately 1.25V).

If both 317 and 318 are logic high at the time the 5VSB is applied, the circuit 22 will assume an active state and keep off the controlled external transistors until about 50 ms after the ATX's 12V output (sensed at the 12V input 311) exceeds the set threshold (typically 10.8V). This timeout feature is necessary in order to insure the main ATX outputs are stabilized. The timeout also assures smooth transitions from sleep into active when sleep states are being supported.

Figure 5:
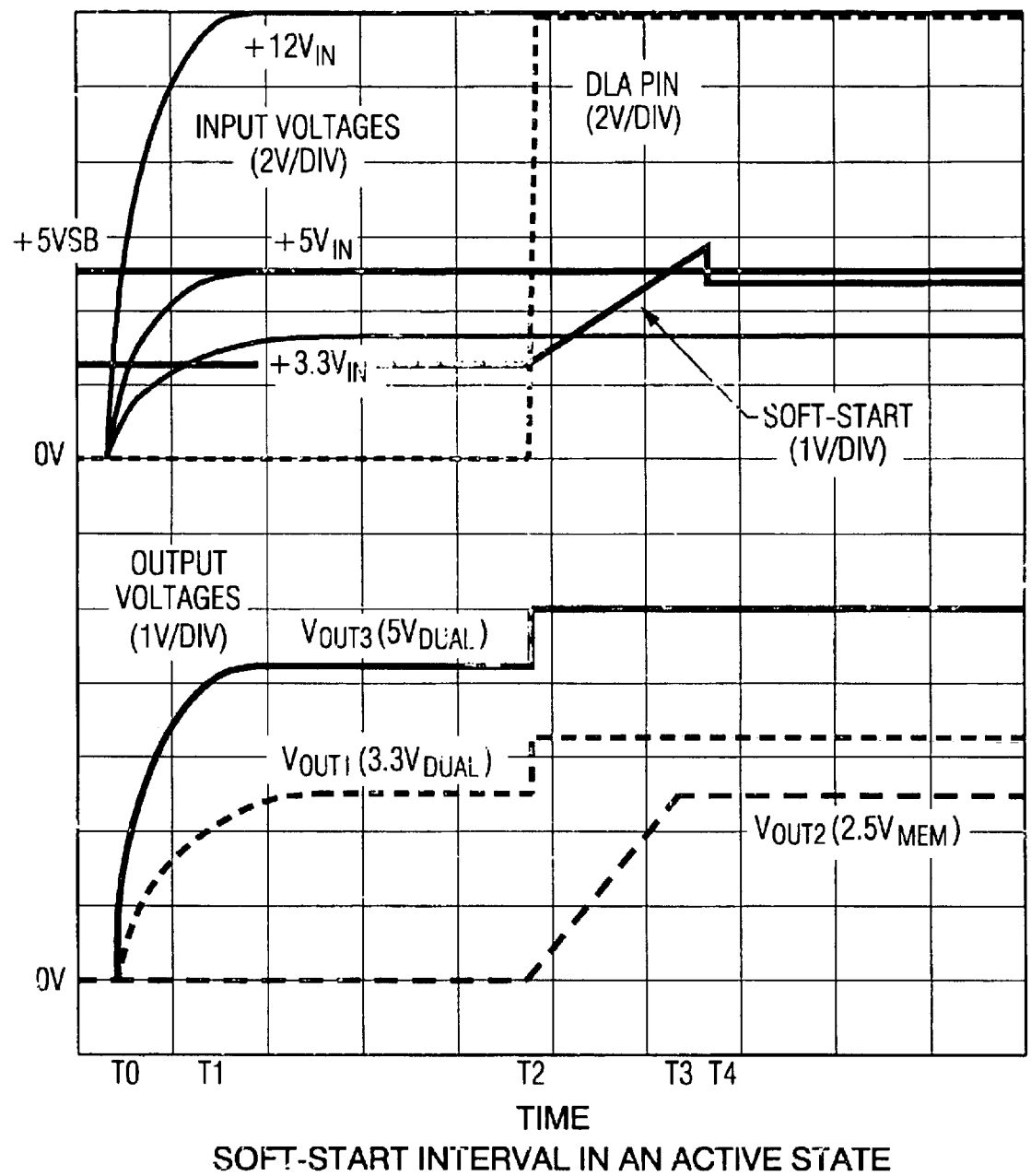
FIG. 5 is a graph showing a soft start interval in an active state.

During sleep to active state transitions from conditions where the outputs are initially 0V (such as S4/S5 to S0 transition with EN3VDL=1 and EN5VDL=0, or simple power-up sequence directly into active state), the 3V DUAL and 5V DUAL outputs go through a quasi soft-start by being pulled high through the body diodes of the N-channel MOSFETs connected between these outputs and the 3.3V and 5V ATX outputs, respectively, FIG. 5 shows this start-up scenario.

5V SB is already present when the main ATX outputs are turned on at a time T0. Similarly, the soft-start capacitor has already been charged up to 1.25V and the clamp is active, awaiting for the 12V power-on reset (POR) timer to expire. As a result of 3.3V IN and 5V IN ramping up, the 3.3V DUAL and 5V DUAL output capacitors C1, C3 charge up through the body diodes of Q3 and Q5, respectively (see FIG. 3). At time T1, the 12V ATX output exceeds the 12V undervoltage threshold of circuit 22, and the internal 50ms (typical) timer 25 (FIG. 2) is initiated. At T2 the time-out initiates a soft-start, and the memory output is ramped-up, reaching regulation limits at time T3. Simultaneous with the memory voltage ramp-up, the DLA output 321 is pulled high (to 12V), turning on Q3 and Q5, and bringing the 3.3V DUAL and 5V DUAL outputs in regulation at time T2. At time T4, when the soft-start voltage reaches approximately 2.8V, the undervoltage monitoring circuits are enabled and the soft-start capacitor is quickly discharged to approximately 2.45V.

Requests to go into a sleep state during an active state soft-start ramp-up result in a chip reset, followed by a new soft-start sequence into the desired state.

Having thus disclosed the preferred embodiment of the invention, those skilled in the art will appreciate that further modifications, changes and omissions of one or more elements to the preferred embodiment may be made without departing from the spirit and scope of the invention.

What is claimed is:

1. An integrated circuit for monitoring and controlling multiple power outputs from a power supply that generates a first primary power voltage and one of more secondary primary power voltages, comprising:

an input means for receiving the fist primary and secondary primary power voltages to generate controlled voltage power outputs;

means for comparing a signal representative of the first primary power voltage to a reference signal;

means for sensing when the first primary power voltage reaches or exceeds a threshold reference level;

means for delaying connection of the first primary and secondary primary power voltages to the controlled voltage power outputs for a selected delay time after the first primary power voltage reaches the reference threshold levels; and means for initiating a soft start after the selected delay time has expired.

2. The integrated circuit of claim 1 further comprising means for generating a power up signal for indicating that all the monitored output voltages of the monitored power supply are at or above a useable and effective voltage level.

3. The integrated circuit of claim 1 wherein the means for comparing comprises a voltage divider and a comparator, wherein the comparator is coupled to a threshold reference voltage and the voltage divider is coupled to the first primary power voltage and to the comparator.

4. The integrated circuit of claim 3 wherein the delaying means comprises a timing circuit and the output of the comparator is coupled to the timing circuit for delaying connection of the input power supply voltages to the controlled outputs for the selected delay time.

5. The integrated circuit of claim 1 further comprising a linear controller for controlling the output voltage of each of the power output voltages of the power monitor circuit.

6. A computer system with monitored power comprising in combination:

a power supply for generating a first primary do power voltage and one or more secondary primary dc power voltages, a motherboard comprising multiple units including a memory unit and a central processing unit, wherein said units may require different operating voltages; and a power monitoring integrated circuit disposed between the power supply and the motherboard for controlling supply power from the power supply to the mother board, said power monitoring circuit comprising, input means for receiving the first primary and secondary primary power voltages from the power supply;

means for controlling the received power voltages to generate controlled voltage power outputs;

means for comparing a signal representative of the first primary power voltage to a reference signal;

means for sensing when the first primary power voltage reaches or exceeds a threshold reference level; and means for delaying connection of the controlled power output voltages to the computer for a selected delay time after the first primary power voltage reaches the reference threshold level, wherein the selected time delay insures the power output voltages are stabilized.

7. The computer system of claim 6 further comprising means for generating a power up signal for indicating that all the monitored output voltages of the monitored power supply are at or above a usable and effective voltage level.

8. The computer system of claim 6 wherein the means for comparing comprises a voltage divider and a comparator, wherein the comparator is coupled to a threshold reference voltage and the voltage divider is coupled to the first primary power voltage and to the comparator.

9. The computer system of claim 8 wherein the delaying means comprised a timing circuit and the output of the comparator is coupled to the timing circuit for delaying connection of the controlled power output voltages to the computer for the selected delay time.

10. The computer system of claim 6 wherein the means for controlling the output voltages comprises a plurality of linear controllers with each linear controller controlling the output voltage of one of the power output voltages of the power monitor circuit.

11. A method for monitoring and controlling power from a power supply that generates a first primary power voltage and one or more secondary primary power voltages related to the first primary power voltage comprising:

receiving the first and secondary primary power voltages from the power supply;

controlling the received power voltages to generate controlled voltage power outputs;

comparing a signal representative of the first primary power voltage to a reference signal;

sensing when the first primary power output voltage reaches or exceeds a threshold reference level; and delaying connection of the power supply controlled voltage power outputs for a selected delay time after the first primary power output voltage reaches the reference threshold level.

12. The method of claim 11 further comprising, generating an output signal indicating that the first primary power voltage has reached at least 90% of its target value.

13. The method of claims 11, wherein the step of comparing a signal representative of the first primary power voltage to a reference voltage her comprises:

dividing a signal representative of the first primary power voltage and comparing the voltage divided signal to a threshold reference voltage.

14. The method of claim 13 wherein the delaying step comprises timing an interval starting when the voltage divided signal exceeds the threshold reference signal and delaying connection of the controlled voltage power outputs to the computer for a selected delay time.

15. The method of claims 11 further comprising linearly controlling each of the power output voltages of the power monitor circuit.

16. A power monitor circuit comprising:

a first input adapted to receive a first primary voltage from a power supply;

one or more secondary inputs to receive one or more secondary primary voltages from the power supply, wherein the one or more secondary primary voltages are related to the first primary voltage;

a comparator circuit adapted to compare the first primary voltage with a reference voltage; and a time delay circuit adapted to delay an output of the one or more secondary primary voltages by a select period of time once the first primary voltage equals or exceeds the reference voltage.

17. The power monitor circuit of claim 16, wherein the comparator circuit further comprises:

a resistor divider network adapted to divide the first primary voltage the resistor divider network comprising:

a first resistor of a first select value, and a second resistor of a second select value, the first and second resistor being adapted to divide the first primary voltage into a select first divided primary voltage; and a comparator having a first input coupled to the resistor divider network to receive the select divided fir;m primary voltage, the compressor having a second input coupled to receive the reference voltage, the comparator fiber having an output coupled to the time delay circuit.

18. The power monitor circuit of claim 16, wherein the reference voltage is approximately equal to 90% of the first primary voltage.

19. The power monitor circuit of claim 16, wherein the time delay circuit outputs the first primary and one or more secondary primary voltages approximately 40 ms after the primary voltage equals or exceeds the reference voltage.

20. The power monitor circuit of claim 16, wherein the first primary voltage is approximately equal to 12 volts, one of the secondary primary voltages is approximately equal to 3.3 volts and another of the secondary primary voltages is approximately equal to 5 volts.

21. A power monitor circuit for monitoring a voltages from a power supply wherein the power supply derives two or more associated voltages, the power monitor circuit comprising:

a first input adapted to receive one voltage of the two or more voltages from the power supply;

a secondary input for each of the remaining two or more voltages; each secondary input adapted to receive an associated one of the remaining two or more voltages;

an output or each of the two or more voltages;

a comparator circuit adapted to the one voltage received at the first input with a reference voltage; and a time delay circuit adapted to delay the coupling of the two or more voltages to the outputs for a select period of time after the comparator has sensed the one voltage received on the first input equals or exceeds the reference voltage.

22. The power monitor circuit of claim 21, wherein the one voltage received on the first input is a first primary voltage and the remaining two or more voltages are secondary primary voltages.

23. The power monitor circuit of claim 21, wherein the reference voltage is in reaction to 90% of the nominal setting of the one voltage received at the first input.

24. The power monitor circuit of claim 21, wherein the select period of time is approximately 40 ms.

25. The power monitor circuit of claim 21, further comprising:

a voltage divider adapted to divide the one voltage received on the first input, wherein the divided one voltage received on the first input is compared to the reference voltage.

* * * * *

UNITED STATES PATENT AND TRADEMARK OFFICE
CERTIFICATE OF CORRECTION

PATENT NO. : 6,882,942 B1  
APPLICATION NO. : 09/552117  
DATED : April 19, 2005  
INVENTOR(S) : Duduman Page 1 of 1

It is certified that error appears in the above-identified patent and that said Letters Patent is hereby corrected as shown below:

At Claim 1, Column 5, Line 43, please replace "fist" with --first--

At Claim 1, Column 5, Line 54, please replace "levels" with --level--

At Claim 6, Column 6, Line 9, please replace "do" with --dc--

At Claim 11, Column 6, Line 54, please add a --,-- after "voltage"

At Claim 13, Column 7, Line 6, please replace "her" with --further--

At Claim 17, Column 7, Line 35, please add a --,-- after "voltage"

At Claim 17, Column 7, Line 43, please replace "fir;m" with --first--

At Claim 17, Column 7, Line 44, please replace "compressor" with --comparator--

At Claim 17, Column 7, Line 46, please replace "fiber" with --further--

At Claim 21, Column 8, Line 23, please replace "or" with --for--

At Claim 21, Column 8, Line 24, please add --compare-- after "to"

At Claim 23, Column 8, Line 36, please replace "reaction" with --relation--

Signed and Sealed this

Thirtieth Day of October, 2007

JON W. DUDAS  
*Director of the United States Patent and Trademark Office*